Nov. 8, 1955　　　　　H. L. SLOTE　　　　　2,722,754
DEVICE FOR TEACHING ELEMENTARY MATHEMATICS
Filed Nov. 8, 1951　　　　　　　　　　　2 Sheets-Sheet 1
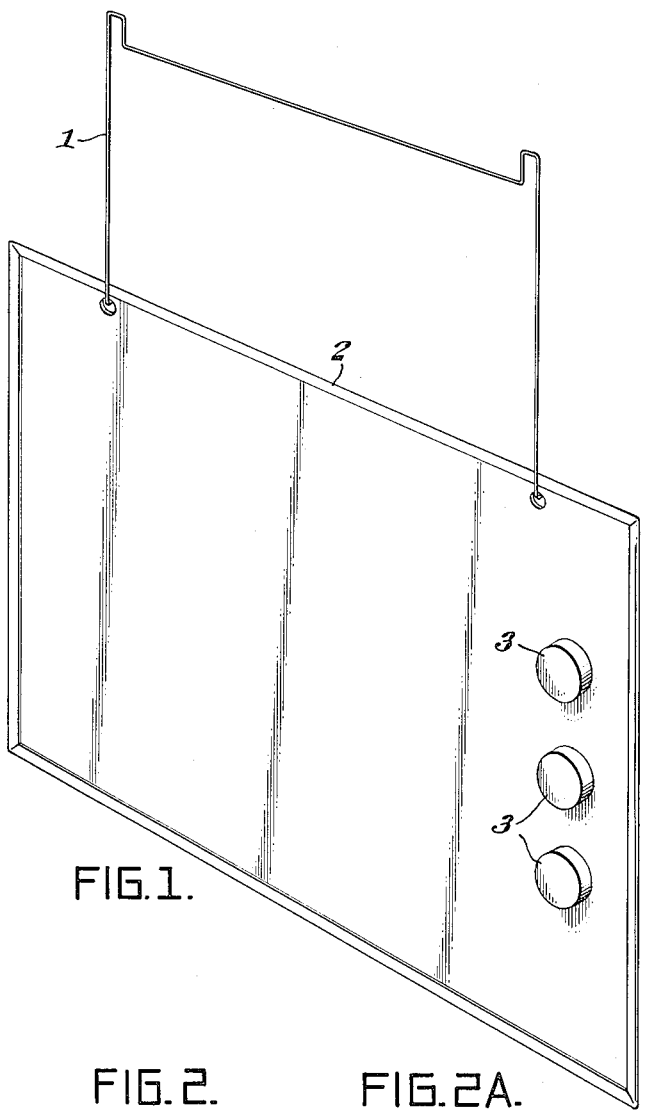
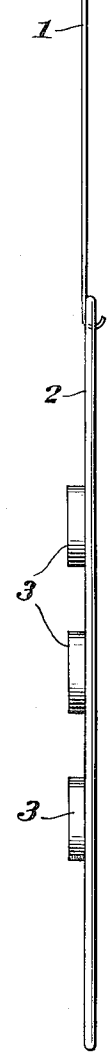
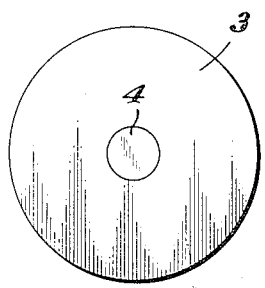
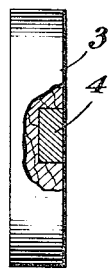
INVENTOR
Herbert L. Slote Nov. 8, 1955 H. L. SLOTE 2,722,754
DEVICE FOR TEACHING ELEMENTARY MATHEMATICS
Filed Nov. 8, 1951 2 Sheets-Sheet 2
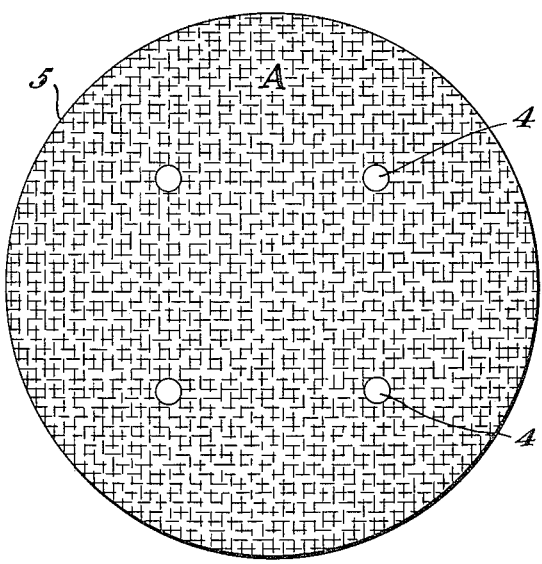
FIG.3.
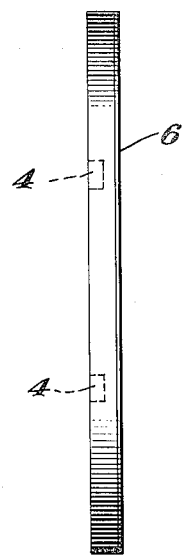
FIG.6.
FIG.7.
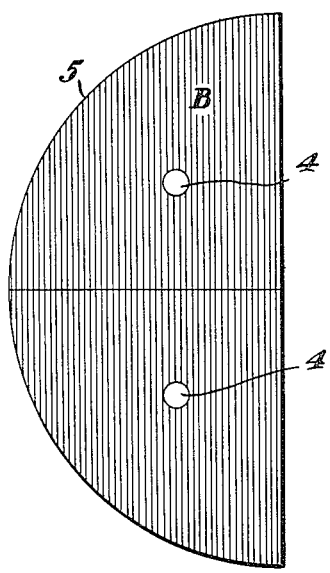
FIG.4.
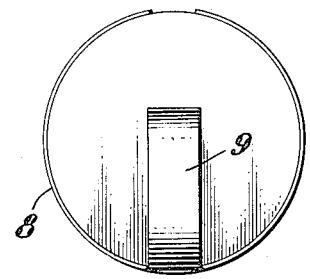
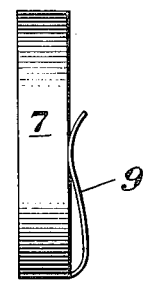
FIG.7A.
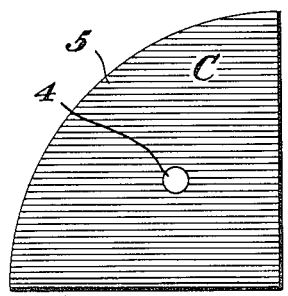
FIG.5.
INVENTOR
Herbert L. Slote United States Patent Office 2,722,754
Patented Nov. 8, 1955

2,722,754

DEVICE FOR TEACHING ELEMENTARY MATHEMATICS

Herbert L. Slote, Brooklyn, N. Y.

Application November 8, 1951, Serial No. 255,423

3 Claims. (Cl. 35—31)

The invention relates to improvements in a demonstration device for enabling the teacher to show a class concretely the various combinations and groupings within numbers. The device is also used to teach fractions concretely. It may also be used to display words and pictures.

The device consists of a steel plate which may be hung in front of the classroom by a wire hanger. A set of 20 wooden discs adheres to the plate by means of small, cylindrical magnets, one of which is sealed into the center of each disc, the pole surfaces being flush with the under surface of the disc. The discs are lacquered lemon-yellow; the steel plate, forest-green. The teacher uses the discs according to a sequence of steps described in courses of study in elementary mathematics. For example, when teaching the number seven, the discs may be grouped in patterns of 2–2–2–1, 4–3, 6–1, 5–2 and other combinations. The discs are stored on the back of the plate, held by their magnetism. They are placed at the front as needed. The advantage of this device over other types of display boards where flannel-surfaced discs are used to cohere to a flannel-surfaced board is that first, the discs do not fall off easily. Second, they can be slid about easily, whereas the flannel discs must be pressed into place. Finally, there is a kinesthetic appeal in feeling a thick, wooden disc and sliding it about.

The same plate is used for teaching fractions, but a set of fractional parts is used instead of the discs. These parts consist of a variety of wooden discs 8″ in diameter, and various sections of the discs, such as halves, fourths, thirds, sixths, and eighths. These sections adhere to the steel plate by means of magnets in their under surfaces. Moreover, the sections can be super-imposed on one another, as two halves on top of a whole. This is possible because the sections have very thin sheet steel bonded to their upper surfaces. The teacher uses the sections according to a sequence set up in courses of study in elementary mathematics.

The device has a third use. It may be used to display words, pictures or diagrams for any teaching procedure. This is done by using removable metal clips which clamp around the circumference of each disc. Cards containing words, pictures or diagrams may be attached to the discs and thus held in view on any part of the metal plate.

In the drawings:

Figure 1 shows a front view of the metal plate and wire hanger. Three discs are shown adhering to the plate.

Figure 1a is a right side view of Figure 1.
Figure 2 is a front view of a disc.
Figure 2a is a left side view of Figure 2.
Figure 3 shows the 8″ whole disc.
Figure 4 shows the half section.
Figure 5 shows the quarter section.
Figure 6 shows a side view of a typical section.
Figure 7 shows the clip which is used on the discs to attach word cards, pictures or diagrams for display on the metal plate.

Figure 7a is a side view of the clip.

A detailed description of the device follows:

The steel plate 2 is shown in front and side view in Figures 1 and 1a. It is made of heavy gauge steel with a fold around its edge to form a sturdy and safe border. Two holes are placed at the top, spaced apart to engage the hooks of the wire hanger 1. The plate is lacquered forest-green with a scratch-proof surface.

The discs 3, Fig. 2, are turned of hard wood, end grain showing. Into each disc a cylindrical Alnico magnet 4 is sealed with one of its poles flush with the under surface of the disc, as seen in Figure 2a.

Figures 3–6 illustrate the discs and fractional parts thereof used for teaching fractions. Each part is made of plywood with magnets in the under-side in various numbers—four in the whole disc, two in the half discs and one in the quarter discs. Figure 3 shows a whole A; Fig. 4 shows a half B; and Fig. 5 shows a quarter C. Fig. 6 shows a cross-section of a whole, which is typical of the construction of the others. Cylindrical magnets 4 are embedded in the discs and fractional sections with one pole flush with the undersurface 5. The upper surface of each disc and section has a very thin sheet of steel 6 bonded to it which enables the user to super-impose one section on top of another as described above. The fractional parts are lacquered in colors—the wholes, yellow; the halves, red; the fourths, blue.

Figures 7 and 7a illustrate the clip 7 used to clamp around the circumference of the discs, so that pictures, diagrams, word cards, etc. may be displayed. The clips are made of spring steel, formed as a split cylindrical band 8 having an integral tongue 9 extending radially toward its center, and are designed to grasp the circumference of the disc firmly. The cards are adapted to be releasably held between the tongue 9 and the surface of the disc.

I am aware that prior to my invention, display boards have been used, made of such materials as flannel, felt and velour, to which objects surfaced with a similar material may cohere. Fractional parts and discs have been used with these devices. I am also aware of the various types of magnetic bulletin boards and movie titlers, but

I claim:

1. An educational device comprising a para-magnetic board and a plurality of discs, some of which are circular in plan and some of which are fractional parts of circular discs, the body of said discs being non-magnetic, permanent magnets embedded in said discs with one surface substantially in the same plane as the bottom of said discs, and a lamination of para-magnetic material secured to the top surfaces of said discs.

2. An educational device comprising a para-magnetic board and a plurality of discs of non-magnetic material, said discs having embedded therein permanent magnets, a surface of which lies in substantially the same plane as the bottom of said discs, a clip removably secured to each said disc, said clip having resilient arms which embrace the periphery of the disc, and a tongue extending from said arms over the top surface of the disc, said tongue having the free end extending convexly away from the surface of said disc, whereby cards or other thin items may be removably inserted between the free arm and said disc.

3. An educational device comprising a para-magnetic board and a plurality of discs of non-magnetic material, said discs having affixed to their under surfaces permanent magnets, a clip removably secured to each said disc, said clip having resilient arms which embrace the periphery of the disc, and a tongue extending from said arms over the top surface of the disc, said tongue having the free end extending convexly away from the surface of said disc, whereby cards or thin items may be removably inserted between the free arm and said disc.

References Cited in the file of this patent

UNITED STATES PATENTS

| | | |
|---|---|---|
| 151,971 | Harrington | June 16, 1874 |
| 798,337 | Hammerlund | Aug. 29, 1905 |
| 1,168,949 | McKittrick et al. | Jan. 18, 1916 |
| 1,531,070 | Bruns | Mar. 24, 1925 |
| 2,254,498 | Scharf | Sept. 2, 1941 |
| 2,570,625 | Zimmerman et al. | Oct. 9, 1951 |

FOREIGN PATENTS

| | | |
|---|---|---|
| 320,046 | Great Britain | Sept. 27, 1929 |
| 428,287 | Great Britain | May 7, 1935 |